(12) United States Patent
Nakamura et al.

(10) Patent No.: US 7,952,966 B2
(45) Date of Patent: May 31, 2011

(54) TRACKING APPARATUS FOR OPTICAL INFORMATION REPRODUCTION APPARATUS

(75) Inventors: Masayoshi Nakamura, Osaka (JP); Akihiko Nishioka, Osaka (JP); Yasuo Nakata, Osaka (JP)

(73) Assignee: Panasonic Corporation, Osaka (JP)

( * ) Notice: Subject to any disclaimer, the term of this patent is extended or adjusted under 35 U.S.C. 154(b) by 195 days.

(21) Appl. No.: 12/515,179

(22) PCT Filed: Nov. 16, 2007

(86) PCT No.: PCT/JP2007/072264
§ 371 (c)(1),
(2), (4) Date: May 15, 2009

(87) PCT Pub. No.: WO2008/059952
PCT Pub. Date: May 22, 2008

(65) Prior Publication Data
US 2010/0034062 A1    Feb. 11, 2010

(30) Foreign Application Priority Data
Nov. 16, 2006 (JP) .................................. 2006-309818

(51) Int. Cl.
*G11B 7/00* (2006.01)
(52) U.S. Cl. ............... 369/44.41; 369/44.32; 369/44.28; 369/47.53
(58) Field of Classification Search ............... 369/44.41, 369/44.28, 44.32, 47.53, 53.22, 53.35, 59.11, 369/59.25, 112.01, 275.4
See application file for complete search history.

(56) References Cited

U.S. PATENT DOCUMENTS

| | | | |
|---|---|---|---|
| 3,962,720 A | 6/1976 | Braat | 386/308 |
| 4,497,048 A | 1/1985 | Kimura | 369/44.41 |
| 6,724,708 B2* | 4/2004 | Ishibashi et al. | 369/59.25 |
| 6,834,030 B2* | 12/2004 | Kishimoto et al. | 369/44.32 |
| 7,633,846 B2* | 12/2009 | Maegawa | 369/59.11 |
| 2004/0208099 A1 | 10/2004 | Nakata | 369/53.22 |
| 2005/0213462 A1* | 9/2005 | Maegawa | 369/59.11 |
| 2006/0013119 A1* | 1/2006 | Hirai | 369/275.4 |
| 2006/0262708 A1* | 11/2006 | Watabe et al. | 369/112.01 |

FOREIGN PATENT DOCUMENTS

JP       52-93222       8/1977

(Continued)

*Primary Examiner* — Thuy N Pardo
(74) *Attorney, Agent, or Firm* — Hamre, Schumann, Mueller & Larson, P.C.

(57) ABSTRACT

A tracking apparatus for an optical information reproduction apparatus includes the following: a photoelectric detector (1) in which a far-field pattern of a light spot converged on a recording medium is formed across a divided light-receiving cell; an arithmetic unit (2) for outputting at least a pair of arithmetic signals from the output of the photoelectric detector (1); a phase comparator (4) for detecting a phase difference between the output signals of the arithmetic unit (2); an absolute value detector (8) for detecting an absolute value of the output signal of the phase comparator (4); a level detector (9) for generating a signal that indicates whether or not a convergence position of the light spot is located off an information track by detecting a predetermined number of times or more the output signal of the absolute value detector (8) has become larger than a predetermined value; a sensitivity detector (10) for detecting and outputting the sensitivity of the level detector (9) by observing the output signal of the level detector (9); and a controller (11) for adjusting the detection conditions of the level detector (9) so that the output of the sensitivity detector (10) is a predetermined value.

6 Claims, 5 Drawing Sheets

FOREIGN PATENT DOCUMENTS

| | | |
|---|---|---|
| JP | 57-181433 | 11/1982 |
| JP | 1-303634 | 12/1989 |
| JP | 2701322 | 10/1997 |
| JP | 2004-253120 | 9/2004 |

* cited by examiner

TRACKING APPARATUS FOR OPTICAL INFORMATION REPRODUCTION APPARATUS

TECHNICAL FIELD

The present invention relates to a tracking apparatus for an optical information reproduction apparatus that optically reads information from a recording medium.

BACKGROUND ART

In recent years, optical information reproduction apparatuses for optically reading information from recording media such as a compact disc (CD) and a DVD have been often used. In these recording media, information is recorded on information tracks having a fine width, and precise tracking control is generally required to reproduce the information from the information tracks. A tracking error needs to be detected to carry out the tracking control, and an optical means is generally used to carry out the detection. There are several known methods for optically detecting a tracking error. In one method, a photoelectric detector including divided light-receiving cells is used. Electric signals are output from light detected by each of the light-receiving cells, and a tracking error is detected from a phase difference between the output signals. Hereinafter, this method is referred to as a "phase difference method". Further, there is also known a three-beam method in which, in addition to a photoelectric detector for receiving a main beam for reading information, a photoelectric detector for receiving a pair of sub beams for detecting a tracking error is used to detect a tracking error from a difference in level between the signals.

One of the major advantages of the optical information reproduction apparatus is that an access time to the target information is short. In order to make use of this advantage, it is important how quickly and stably a tracking servo is carried out on the target information track.

Hereinafter, an example of a tracking apparatus for the above-described conventional optical information reproduction apparatus will be described with reference to the drawings.

Figure 4:
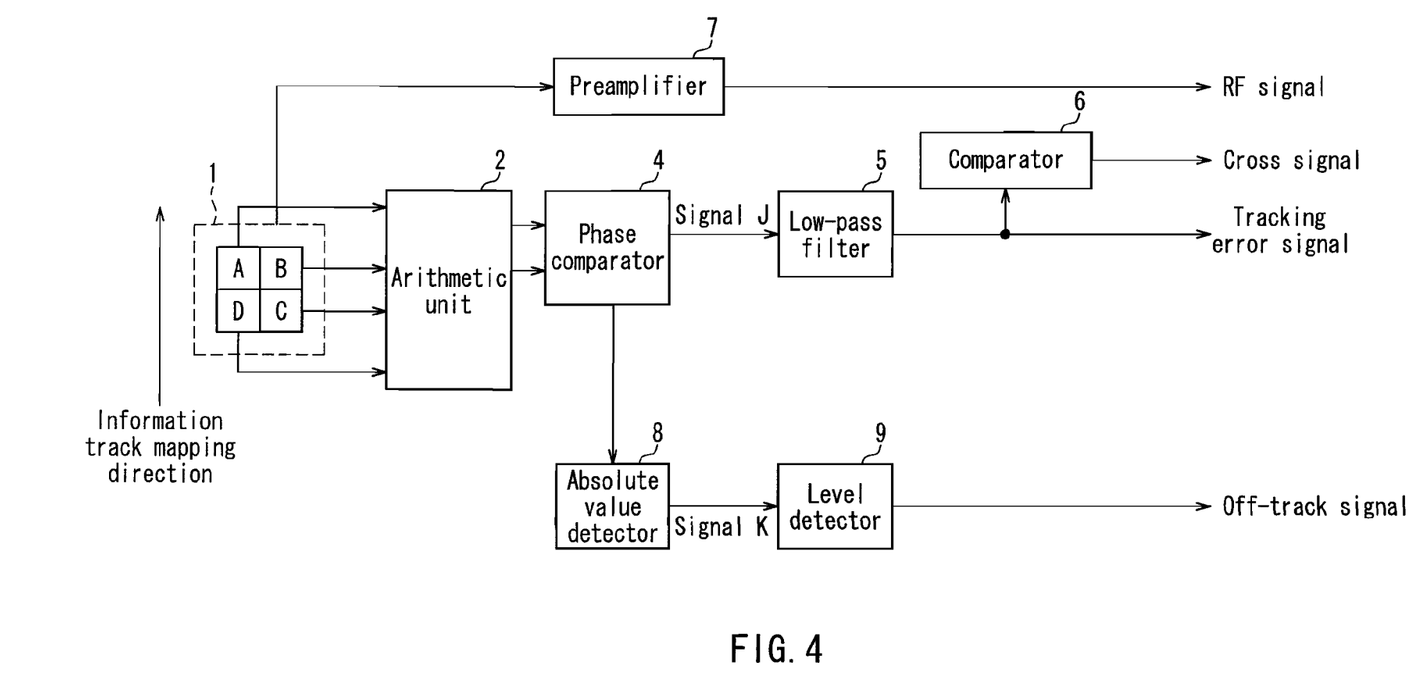
FIG. 4 is a block diagram showing a functional configuration of a portion for detecting a tracking control signal in a tracking apparatus for a conventional optical information reproduction apparatus.

FIG. 4 shows a tracking control signal detector in the tracking apparatus for the conventional optical information reproduction apparatus employing the phase difference method. In FIG. 4, reference numeral 1 denotes a photoelectric detector, 2 denotes an arithmetic unit, 4 denotes a phase comparator, 5 denotes a low-pass filter, 6 denotes a comparator, 7 denotes a preamplifier, 8 denotes an absolute value detector, and 9 denotes a level detector.

Hereinafter, a configuration and an operation of the conventional tracking control signal detector shown in FIG. 4 will be described.

As shown in FIG. 4, the photoelectric detector 1 includes four light-receiving cells A, B, C and D that are separated from one another by a parting line substantially parallel to the direction in which the mapping of an information track extends and by a parting line substantially perpendicular to the parting line. The outputs from these four light-receiving cells are calculated by the arithmetic unit 2 so that a tracking phase difference can be detected. Consequently, the arithmetic unit 2 outputs at least a pair of arithmetic signals. The phase comparator 4 compares the phases of the pair of arithmetic signals and outputs a tracking phase difference signal (signal J). Further, the low-pass filter 5 removes a ripple component from the signal J and outputs a tracking error signal. The comparator 6 compares the tracking error signal with a reference level, and thus can output a cross signal indicating that a light spot has crossed an information track (JP S52-93222A, JP S57-181433 A).

The absolute value detector 8 receives the output of the phase comparator 4 and outputs a tracking phase difference absolute value signal (signal K). The level detector 9 detects a predetermined number of times or more the signal K has become larger than a predetermined value, and outputs a signal (so-called off-track signal) at the "L" level when the light spot is positioned on an information track or at the "H" level when the light spot is positioned between information tracks (JP 2701322 A). Terms other than the "off-track signal" may be used to describe the signal that indicates whether or not the light spot is positioned on an information track. In this specification, the signal is referred to as an "off-track signal", as described above.

An information reproduction signal is obtained from the output of the photoelectric detector 1 and amplified by the preamplifier 7 into an RF signal.

A cross signal is used to count the number of tracks skipped by the light spot for reading information when accessing the target information track or to detect track skipping in trick play such as a pause operation. The off-track signal is used, for example, to determine the stability of a tracking servo.

A direction signal that indicates a direction in which the light spot moves when accessing the target information track can be detected from the phase relationship between the cross signal and the off-track signal. By using this direction signal, a tracking breaking device capable of converging mechanical vibrations of the tracking apparatus in a short time can be operated. Moreover, if waveform shaping is carried out by using the cross signal and the off-track signal to remove edge noise, the number of skipped tracks can be counted more accurately.

DISCLOSURE OF INVENTION

Problem to be Solved by the Invention

Figure 5:
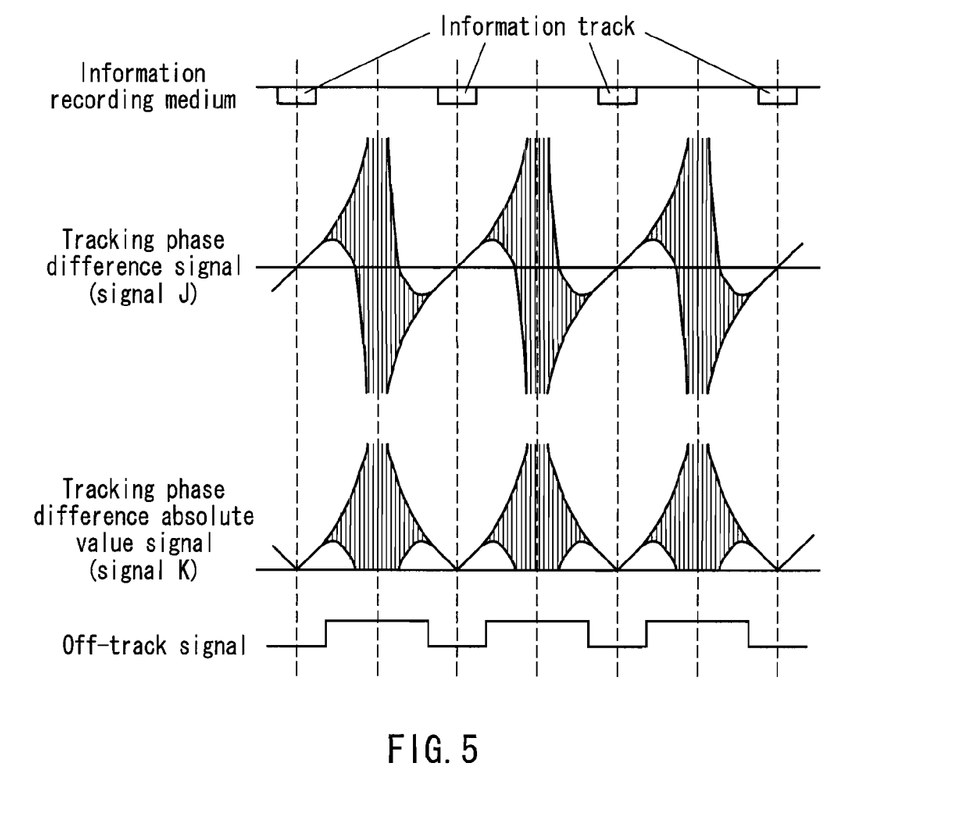
FIG. 5 is a signal waveform diagram showing unfavorable conditions such as a tilt of the optical axis in a conventional tracking control signal detector.

However, the conventional configuration as described above has the following problems. Since the off-track signal is obtained from the tracking phase difference absolute value signal (signal K), if the information signals of adjacent tracks are mixed with a normal information signal due to, e.g., the occurrence of aberration of the light spot caused by warpage of the recording medium, a deviation of the optical characteristics, or a tilt of the optical axis of the optical pickup serving as an information reading means, the tracking phase difference signal (signal J) becomes larger even with a small deviation of the light spot from an information track, and the tracking phase difference absolute value signal (signal K) also becomes larger. Thus, as shown in FIG. 5, the duty ratio of the off-track signal at the "H" level that indicates that the light spot is positioned between information tracks is increased excessively, and the signal cannot be detected successfully. If the duty ratio of the off-track signal is off-balance and a direction signal is detected erroneously, the operation of the tracking apparatus becomes unstable.

In the case of a disc that includes multi-layered information recording surfaces to record more information, such as a dual layer disc that has been practically used in DVD, one of the information recording surfaces is selected by the movement of a focusing actuator of the optical pickup, and thereby information is reproduced. However, if the optical axis of the optical pickup is somewhat tilted due to the movement of the focusing actuator, the off-track signal cannot be obtained successfully, similarly to the above-described case. This may obstruct a further increase in the number of layers of a recording medium in the future.

With the foregoing in mind, it is an object of the present invention to provide a tracking apparatus for an optical information reproduction apparatus that can operate stably without being disturbed by warpage of the recording medium, a deviation of the optical characteristics, or a tilt of the optical axis of the optical pickup serving as an information reading means.

Means for Solving Problem

In order to achieve the above object, a tracking apparatus for an optical information reproduction apparatus according to the present invention includes the following: a photoelectric detector including a light-receiving cell divided into at least four areas by a parting line substantially parallel to a direction in which the mapping of an information track of a recording medium on which information is optically recorded extends and by a parting line substantially perpendicular to the parting line, wherein a far-field pattern of a light spot converged on the recording medium is formed across the divided light-receiving cell; an arithmetic unit for receiving the output of the photoelectric detector and outputting at least a pair of arithmetic signals so that a tracking phase difference can be detected; a phase comparator for detecting a phase difference between the output signals of the arithmetic unit; an absolute value detector for detecting an absolute value of the output signal of the phase comparator; a level detector for generating a signal that indicates whether or not a convergence position of the light spot is located off an information track of the recording medium by detecting an over-threshold frequency of an output signal of the absolute value detector becoming larger than a predetermined value; a sensitivity detector for detecting and outputting the sensitivity of the level detector by observing the signal output from the level detector; and a controller for adjusting the detection conditions of the level detector so that the output of the sensitivity detector is a predetermined value.

Effects of the Invention

In the tracking apparatus for an optical information reproduction apparatus of the present invention, the sensitivity detector observes the signal output from the level detector, and the controller adjusts the detection conditions of the level detector so that the output signal of the level detector is optimum. Consequently, the output signal of the level detector is less disturbed by warpage of the recording medium, a deviation of the optical characteristics, or a tilt of the optical axis of the optical pickup provided in the optical information reproduction apparatus. Thus, the stability of the tracking apparatus that can deal with variations of the recording medium or the like can be improved significantly.

DESCRIPTION OF THE INVENTION

The tracking apparatus for an optical information reproduction apparatus of the present invention includes the level detector for generating a signal that indicates whether or not a convergence position of the light spot is located off an information track of the recording medium by detecting an over-threshold frequency of an output signal of the absolute value detector becoming larger than a predetermined value, the sensitivity detector for detecting and outputting the sensitivity of the level detector by observing the signal output from the level detector, and the controller for adjusting the detection conditions of the level detector so that the output of the sensitivity detector is a predetermined value. With this configuration, even if the output signal of the absolute value detector becomes larger due to, e.g., warpage of the recording medium, a deviation of the optical characteristics, or a tilt of the optical axis of the optical pickup, the sensitivity detector observes the signal output from the level detector, and the controller adjusts the sensitivity of the level detector, so that the signal output from the level detector can be optimized. As a result, the stability of the tracking apparatus that can deal with variations of the recording medium or the like can be improved significantly.

Moreover, the above configuration is highly effective in reducing the cost of the tracking apparatus, since the performance requirements for a tilt of the optical axis of the optical pickup or the like also can be reduced. Further, it is possible to improve a margin for a tilt of the optical axis of the optical pickup that occurs due to the movement of a focusing actuator when the recording medium includes multi-layered information recording surfaces.

It is preferable that the tracking apparatus for an optical information reproduction apparatus of the present invention further includes a low-pass filter for outputting a tracking error signal by smoothing the output signal of the phase comparator, and a period detector for detecting a period in which the polarity of the tracking error signal is reversed as the light spot crosses an information track, wherein the controller adjusts and stores the detection conditions of the level detector so that the output of the sensitivity detector is a predetermined value when the period detected by the period detector is within a predetermined range. This configuration can prevent the time it takes to detect the sensitivity of the level detector with the sensitivity detector from being longer due to, e.g., an excessively low frequency of the light spot crossing the information track. On the contrary, it also can prevent the detection of the sensitivity of the level detector with the sensitivity detector from being unstable due to, e.g., an excessively high frequency of the light spot crossing the information track.

It is also preferable that the tracking apparatus for an optical information reproduction apparatus of the present invention further includes a low-pass filter for outputting a tracking error signal by smoothing the output signal of the phase comparator, a comparator for generating and outputting a cross signal that indicates that the light spot has crossed an information track by comparing the tracking error signal with a predetermined reference value, and a period detector for detecting a period in which the level of the cross signal is switched as the light spot crosses an information track, wherein the controller adjusts and stores the detection conditions of the level detector so that the output of the sensitivity detector is a predetermined value when the period detected by the period detector is within a predetermined range. Like the above configuration, this configuration also can prevent the time it takes to detect the sensitivity of the level detector with the sensitivity detector from being longer due to, e.g., an excessively low frequency of the light spot crossing the information track. On the contrary, it also can prevent the detection of the sensitivity of the level detector with the sensitivity detector from being unstable due to, e.g., an excessively high frequency of the light spot crossing the information track.

In the tracking apparatus for an optical information reproduction apparatus of the present invention, it is preferable that the sensitivity detector detects a duty ratio of the signal output from the level detector as the sensitivity of the level detector, and the controller adjusts the detection conditions of the level detector so that the duty ratio is a predetermined ratio. In this case, it is preferable to adjust the detection conditions of the level detector so that, in the duty ratio of the signal output from the level detector, a length of an "H" level indicating that the light spot is positioned between information tracks is shorter than a length of an "L" level indicating that the light spot is positioned on an information track. More specifically, it is preferable to set the detection conditions of the level detector so that the duty ratio at the "H" level is about 30% to 45%.

In the tracking apparatus of the present invention that includes the low-pass filter for outputting a tracking error signal by smoothing the output signal of the phase comparator, and the comparator for generating and outputting a cross signal that indicates that the light spot has crossed an information track by comparing the tracking error signal with a predetermined reference value, when the sensitivity detector detects the duty ratio of the signal output from the level detector as the sensitivity of the level detector, and the controller adjusts the detection conditions of the level detector so that the duty ratio is a predetermined ratio, as described above, the phase relationship between the cross signal and the signal (so-called off-track signal) output from the level detector can be maintained favorably. Thus, a direction signal that indicates a direction in which the light spot moves when accessing the target information track can be detected more stably. This is because the direction signal can be determined from the phase relationship between the cross signal and the so-called off-track signal.

It is preferable that the sensitivity detector detects an average voltage of the signal output from the level detector as the sensitivity of the level detector, and the controller adjusts the detection conditions of the level detector so that the average voltage is a predetermined voltage.

The controller may learn, set, and store the detection conditions of the level detector, for example, every time the recording medium is inserted into the optical information reproduction apparatus. Alternatively, the controller may set the detection conditions of the level detector every insertion of the recording medium as needed.

When the recoding medium is a so-called multi-layer medium having a plurality of information recording layers, the optical axis of the optical pickup can be somewhat tilted due to the movement of a focusing actuator while one of the information recording layers is selected and reproduced in accordance with the movement of the focusing actuator of the optical pickup. In such a case, therefore, it is preferable that the detection conditions of the level detector is learned and set for each of the information recording layers.

The level detector may include a so-called envelope detection circuit for detecting a signal (so-called off-track signal) that indicates whether or not a convergence position of the light spot is located off an information track of the recording medium from the output signal of the absolute value detector, and compare the detection signal with a predetermined level (i.e., off-track detection reference signal) set by the controller as the detection conditions. However, if the time constant of the envelope detection circuit is too large, the off-track signal cannot be detected when the information track crossing speed of the light spot is fast. On the contrary, if the time constant of the envelope detection circuit is too small, the edge noise of the off-track signal may be increased. In the worst case, if the time constant of the envelope detection circuit is too small, the off-track signal that should be at the "H" level may be at the "L" level when the light spot is positioned between information tracks. In order to solve this problem, the time constant of the envelope detection circuit also may be adjusted or learned by the controller.

If a so-called Schmitt trigger function is used to compare the output of the envelope detection circuit and the off-track detection reference signal adjusted by the controller, the edge noise of the off-track signal can be reduced. Moreover, if the level of the Schmitt trigger function is adjusted by the controller, the edge noise of the off-track signal can be reduced further.

Hereinafter, specific embodiments of the tracking apparatus for an optical information reproduction apparatus of the present invention will be described with reference to the drawings.

First Embodiment

Figure 1:
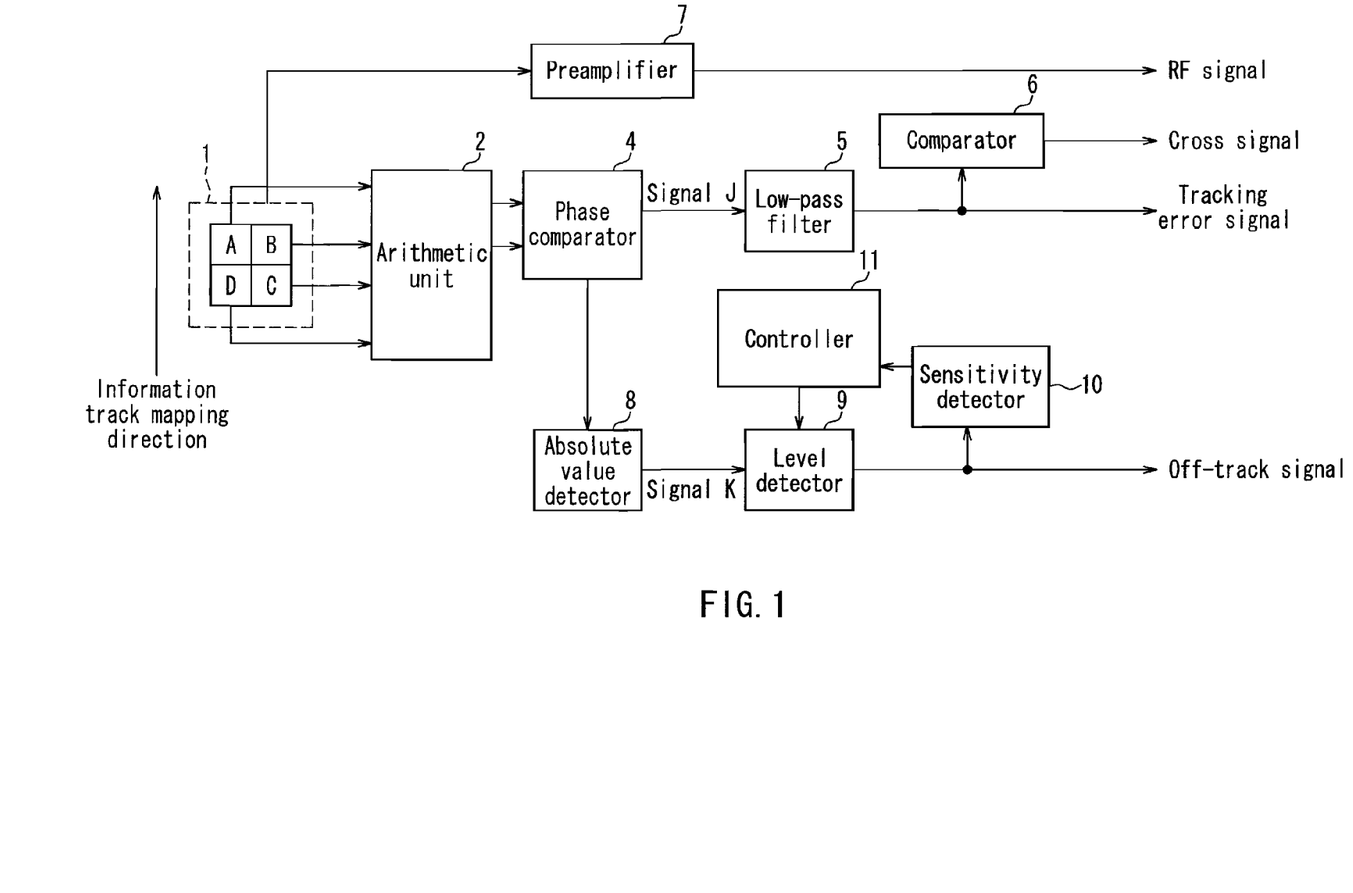
FIG. 1 is a block diagram particularly showing a functional configuration of a portion for detecting a tracking control signal in a tracking apparatus for an optical information reproduction apparatus according to a first embodiment of the present invention.
Figure 2:
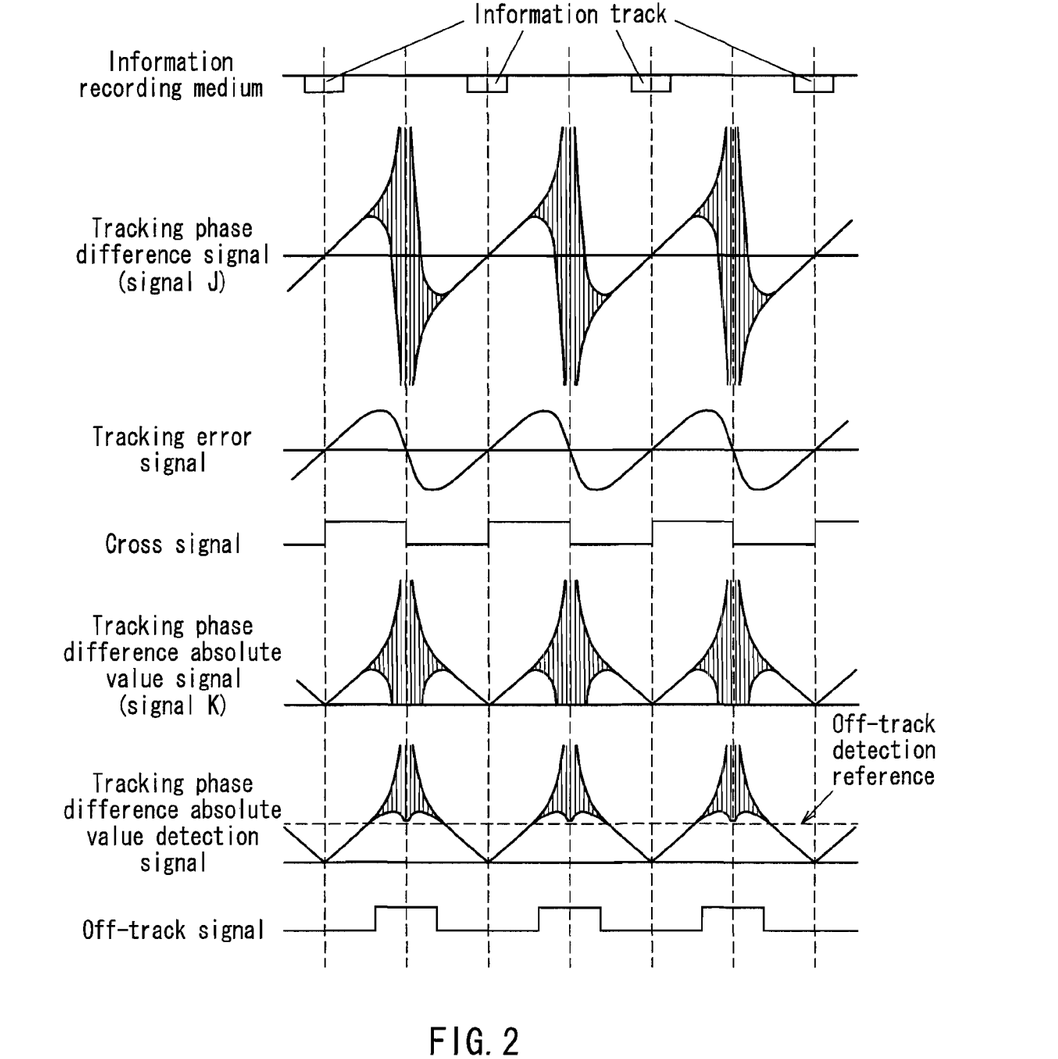
FIG. 2 is a signal waveform diagram showing the waveforms of major output signals of the blocks shown in FIG. 1.

FIG. 1 particularly shows a functional configuration of a portion for detecting a tracking control signal in a tracking apparatus for an optical information reproduction apparatus according to a first embodiment of the present invention. In FIG. 1, reference numeral 1 denotes a photoelectric detector, 2 denotes an arithmetic unit, 4 denotes a phase comparator, 5 denotes a low-pass filter, 6 denotes a comparator, 7 denotes a preamplifier, 8 denotes an absolute value detector, 9 denotes a level detector, 10 denotes a sensitivity detector, and 11 denotes a controller. FIG. 2 shows the waveforms of major output signals of the blocks shown in FIG. 1.

Hereinafter, an operation of the tracking apparatus according to the present embodiment will be described with reference to FIGS. 1 and 2. Components having the functions similar to those in the conventional configuration described in Background Art are denoted by the same reference numerals, and the description thereof will not be repeated.

As shown in FIG. 1, the photoelectric detector 1 includes a light-receiving cell divided into four areas A to D. The outputs (electric signals) from each of the areas A to D are calculated by the arithmetic unit 2, so that a pair of arithmetic signals is provided. Then, the phase comparator 4 compares the phases of the pair of arithmetic signals and outputs a tracking phase difference signal (signal J). Further, the low-pass filter 5 receives the signal J and outputs a tracking error signal. Across signal can be obtained from the tracking error signal through the comparator 6.

The absolute value detector 8 receives the output of the phase comparator 4 and outputs a tracking phase difference absolute value signal (signal K). The level detector 9 detects a frequency with which the level of the signal K has become larger than an off-track detection reference (the OFTR detection reference shown in FIG. 2) set by the controller 11, and outputs an off-track signal at the "H" level that indicates that the light spot is positioned between information tracks when the frequency is not less than a threshold. The level detector 9 outputs an off-track signal at the "L" level that indicates that the light spot is positioned on an information track when the frequency is not more than the threshold. The level detector 9 can be formed by using a so-called envelope detection circuit. The waveform of the off-track signal detected by the level detector 9 in the above manner is shown in the bottom row of FIG. 2.

The sensitivity detector 10 detects the sensitivity of the level detector 9 by observing the off-track signal and outputs the detection result to the controller 11. The controller 11 sets the detection conditions (i.e., the OFTR (off-track) detection reference shown in FIG. 2) of the level detector 9 so that the output of the sensitivity detector 10 is a predetermined value. It is also preferable that the controller 11 further adjusts the time constant of the envelope detection circuit constituting the level detector 9 or the level of a Schmitt trigger function for comparing the output of the envelope detection circuit and an OFTR detection reference signal.

Specifically, the sensitivity detector 10 detects, for example, the duty ratio of the off-track signal as the sensitivity of the level detector 9. The sensitivity detector 10 can be achieved by a microcomputer or a duty detector. The controller 11 adjusts the detection conditions of the level detector 9 so that the duty ratio at the "H" level to be detected by the sensitivity detector 10 falls in a predetermined range. In this case, it is preferable to adjust the detection conditions of the level detector 9 so that the duty ratio at the "H" level is less than 50%. It is more preferable to adjust the detection conditions of the level detector 9 so that the duty ratio at the "H" level is about 30% to 45%.

The duty ratio can be detected by detecting an average value of the off-track signal in addition to the above method for detecting the lengths during which the off-track signal is at the "H" and "L" levels, respectively. That is, the sensitivity detector 10 may determine an integral value of the off-track signal as the sensitivity of the level detector 9. In this case, the sensitivity detector 10 can be achieved by an integrating circuit. The controller 11 sets the sensitivity (i.e., the level of the OFTR detection reference, the time constant of the envelope detection circuit, or the level of the Schmitt trigger function) of the level detector 9 so that the integral value detected by the sensitivity detector 10 falls in a predetermined range (e.g., 0.30 to 0.45, although the integral value is not limited thereto).

Second Embodiment

Figure 3:
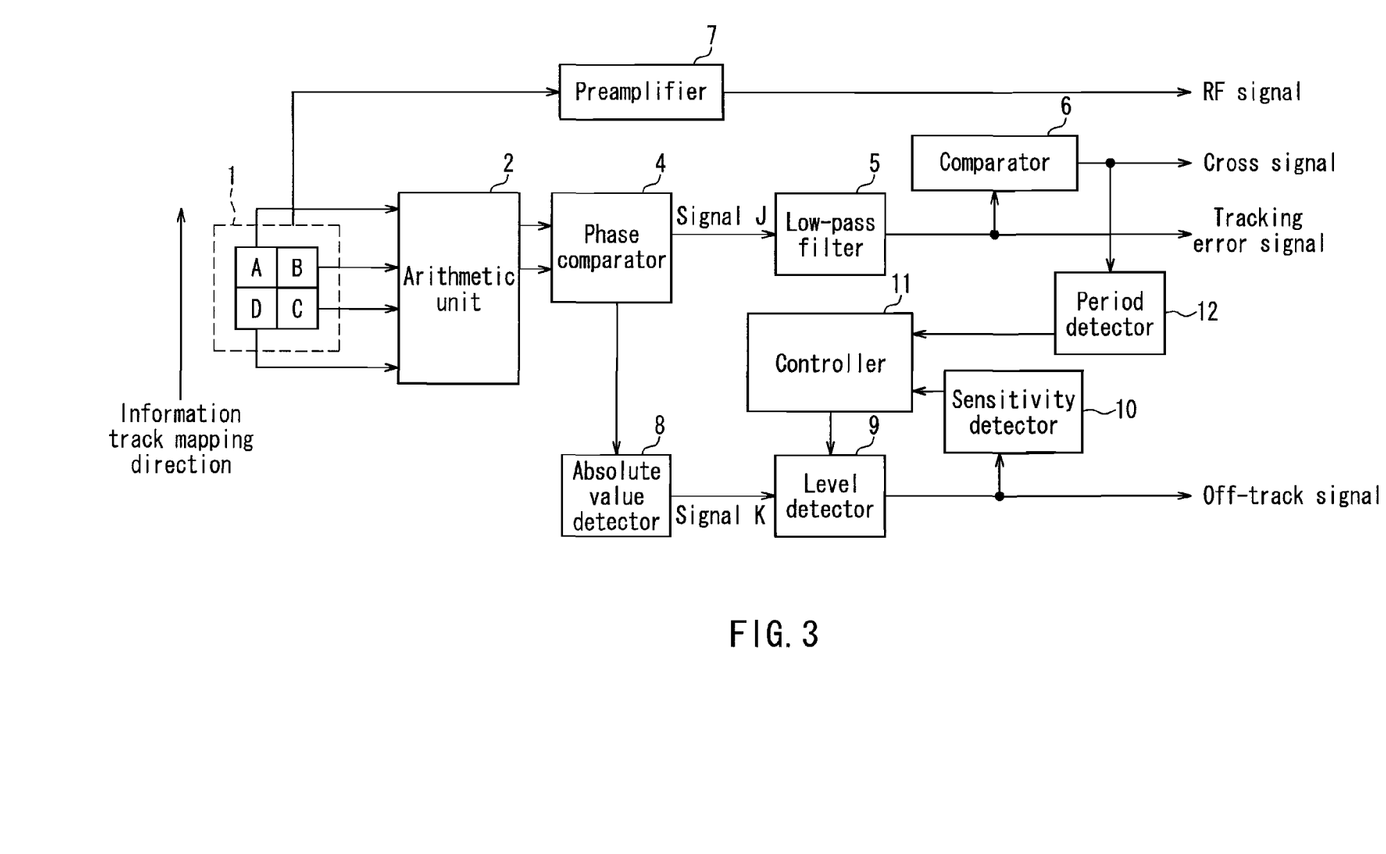
FIG. 3 is a block diagram particularly showing a functional configuration of a portion for detecting a tracking control signal in a tracking apparatus for an optical information reproduction apparatus according to a second embodiment of the present invention.

FIG. 3 is a block diagram showing a functional configuration of a tracking apparatus for an optical information reproduction apparatus according to a second embodiment of the present invention. In FIG. 3, reference numeral 12 denotes a period detector that detects a period in which the level of a cross signal output from the comparator 6 is switched as a light spot crosses an information track. The cross signal indicates that the light spot has crossed an information track. The cross signal is obtained in such a manner that the comparator 6 compares a tracking error signal output from the low-pass filter 5 with a reference level and outputs the comparison result as a value of "0" or "1". FIG. 3 shows an example of the configuration in which the period detector 12 detects a switching period of the level of the cross signal. However, the period detector 12 may detect a reverse period of the tracking error signal. This is because the polarity of the tracking error signal is reversed as the light spot crosses an information track.

As described above, the period detector 12 detects either a period in which the level of the cross signal is switched as the light spot crosses an information track or a period in which the polarity of the tracking error signal is reversed as the light spot crosses an information track, and outputs the detected period to the controller 11. The controller 11 adjusts the detection conditions of the level detector 9 so that the output of the sensitivity detector 10 is a predetermined value only when the value of the period detected by the period detector 12 is within a predetermined range. It is preferable that the controller 11 learns the result of the adjustment of the detection conditions of the level detector 9 and stores it in the internal memory (not shown) only when the value of the period detected by the period detector 12 is within a predetermined range.

The detection conditions of the level detector 9 are set by the controller 11 so that the output of the sensitivity detector 10 is a predetermined value when the output of the period detector 12 is within a predetermined period range, i.e., when the frequency of the light spot crossing the information track is within a predetermined range, and the detection conditions thus set are stored in the internal memory. This can prevent the time it takes to detect the sensitivity of the level detector 9 with the sensitivity detector 10 from being longer due to, e.g., an excessively low frequency of the light spot crossing the information track, or can prevent the detection of the sensitivity of the level detector 9 with the sensitivity detector 10 from being unstable due to, e.g., an excessively high frequency of the light spot crossing the information track.

In the present embodiment, the light-receiving cell of the photoelectric detector 1 is divided into four areas. However, the light-receiving cell may be divided into more than four areas. The operations of each of the portions such as the absolute value detector 8 and the level detector 9 are described using analog signals. However, it is needless to say that there is no problem even if the operations are performed using digital signals or controlled by computer software. In addition, the present invention is not limited by the method for detecting the tracking error signal, the arrangement of the light-receiving cell of the photoelectric detector, or the like.

INDUSTRIAL APPLICABILITY

The present invention is industrially applicable as a tracking apparatus for an optical information recording apparatus that optically reads information from recording media such as a CD, DVD, and BD, although the recording media are not limited thereto.

The invention claimed is:

1. A tracking apparatus for an optical information reproduction apparatus comprising:
a photoelectric detector comprising a light-receiving cell divided into at least four areas by a parting line substantially parallel to a direction in which mapping of an information track of a recording medium on which information is optically recorded extends and by a parting line substantially perpendicular to the parting line, wherein a far-field pattern of a light spot converged on the recording medium is formed across the divided light-receiving cell;
an arithmetic unit for receiving an output of the photoelectric detector and outputting at least a pair of arithmetic signals so that a tracking phase difference can be detected;

a phase comparator for detecting a phase difference between the output signals of the arithmetic unit;

an absolute value detector for detecting an absolute value of an output signal of the phase comparator;

a level detector for generating and outputting a signal that indicates whether or not a convergence position of the light spot is located off an information track of the recording medium by detecting an over-threshold frequency of an output signal of the absolute value detector becoming larger than a predetermined value;

a sensitivity detector for detecting and outputting sensitivity of the level detector by observing a signal output from the level detector; and a controller for adjusting detection conditions of the level detector so that the output of the sensitivity detector is a predetermined value, wherein the controller adjusts the detection conditions of the level detector so that, in the duty ratio, a length of an "H" level indicating that the light spot is positioned between information tracks is shorter than a length of an "L" level indicating that the light spot is positioned on an information track.

2. The tracking apparatus for an optical information reproduction apparatus according to claim 1 further comprising:

a low-pass filter for outputting a tracking error signal by smoothing the output signal of the phase comparator; and a period detector for detecting a period in which a polarity of the tracking error signal is reversed as the light spot crosses an information track, wherein the controller adjusts and stores the detection conditions of the level detector so that the output of the sensitivity detector is a predetermined value when the period detected by the period detector is within a predetermined range.

3. The tracking apparatus for an optical information reproduction apparatus according to claim 1 further comprising:

a low-pass filter for outputting a tracking error signal by smoothing the output signal of the phase comparator;

a comparator for generating and outputting a cross signal that indicates that the light spot has crossed an information track by comparing the tracking error signal with a predetermined reference value; and a period detector for detecting a period in which a level of the cross signal is switched as the light spot crosses an information track, wherein the controller adjusts and stores the detection conditions of the level detector so that the output of the sensitivity detector is a predetermined value when the period detected by the period detector is within a predetermined range.

4. The tracking apparatus for an optical information reproduction apparatus according to claim 1, wherein when the recording medium is a multi-layer medium having a plurality of information recording layers, the detection conditions of the level detector are learned and set for each of the information recording layers.

5. The tracking apparatus for an optical information reproduction apparatus according to claim 1, wherein the level detector comprises a wave envelope detector for detecting a signal that indicates whether or not a convergence position of the light spot is located off an information track of the recording medium from the output signal of the absolute value detector, and the controller determines a time constant of the wave envelope detector by comparing a detection signal detected by the wave envelope detector and a predetermined level set by the controller as the detection conditions.

6. The tracking apparatus for an optical information reproduction apparatus according to claim 5, wherein the level detector has a Schmitt trigger function for comparing the output of the wave envelope detector and an off-track detection reference signal adjusted by the controller, and the controller adjusts a level of the Schmitt trigger function so as to reduce edge noise of the output signal of the level detector.

* * * * *